Nov. 28, 1950  D. BULGIN  2,531,609
ELECTRICAL APPARATUS FOR MEASURING
ELECTROSTATIC VOLTAGES
Filed Feb. 18, 1946  2 Sheets-Sheet 1
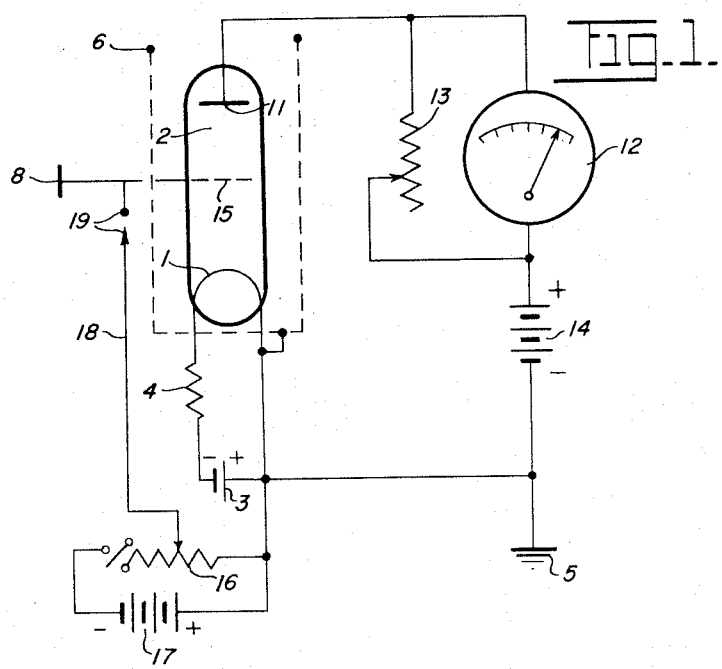
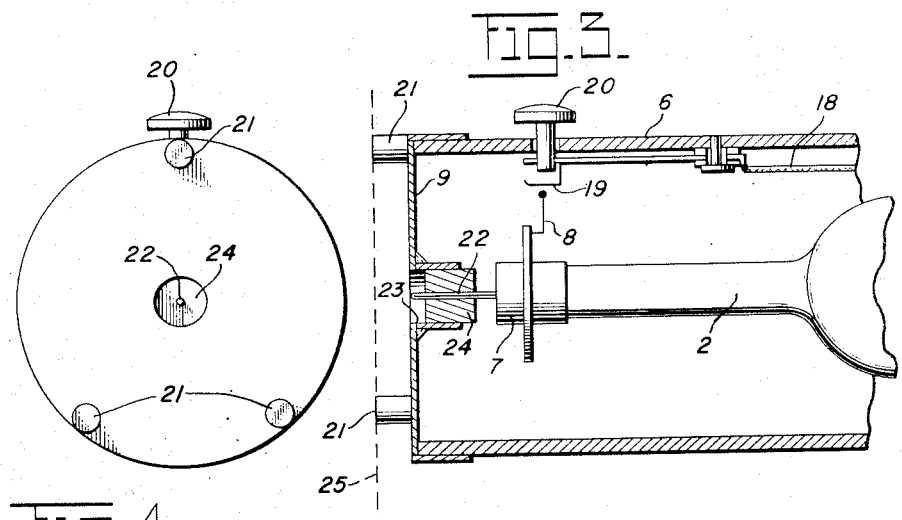
INVENTOR
DOUGLAS BULGIN
BY Benj. T. Rauber
ATTORNEY Nov. 28, 1950     D. BULGIN     2,531,609
ELECTRICAL APPARATUS FOR MEASURING
ELECTROSTATIC VOLTAGES
Filed Feb. 18, 1946     2 Sheets-Sheet 2
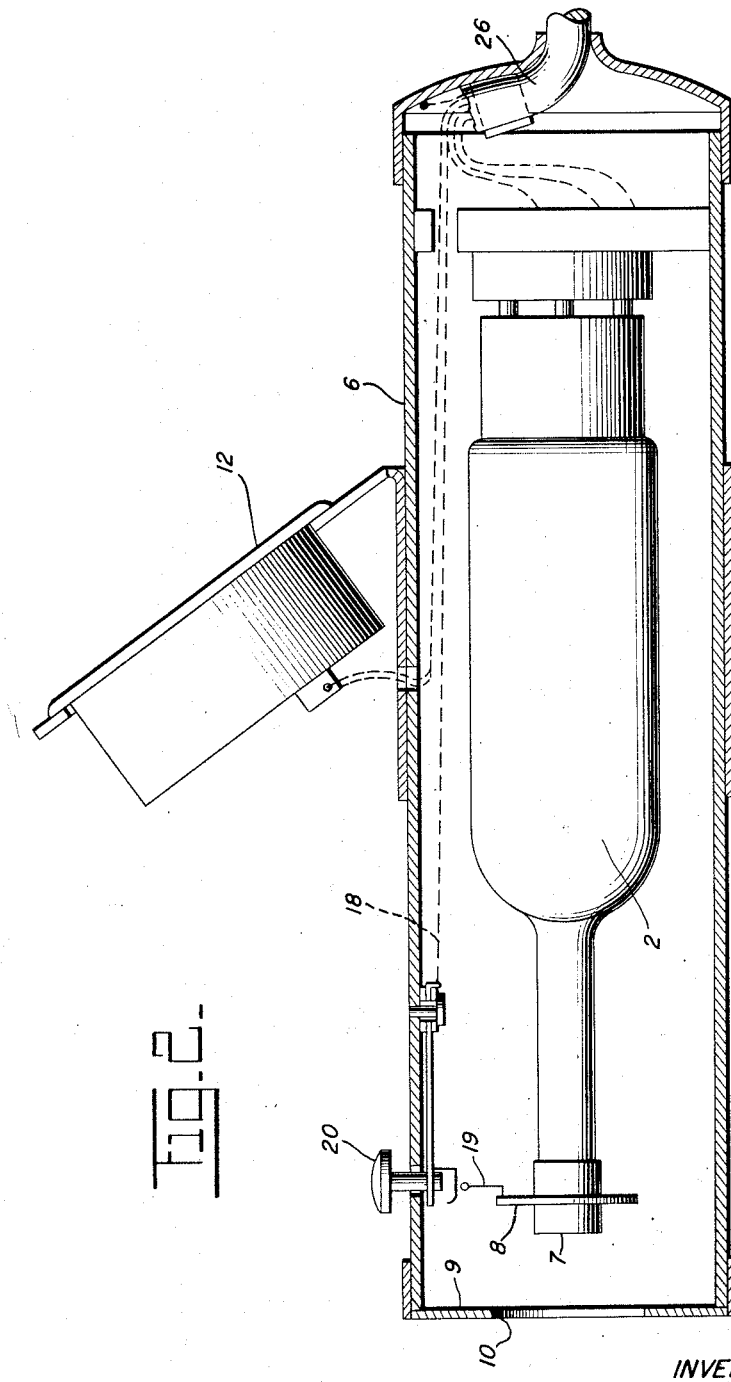
INVENTOR
DOUGLAS BULGIN
BY Benj. T. Rauber
ATTORNEY Patented Nov. 28, 1950

2,531,609

UNITED STATES PATENT OFFICE 2,531,609

ELECTRICAL APPARATUS FOR MEASURING ELECTROSTATIC VOLTAGES

Douglas Bulgin, Erdington, Birmingham, England, assignor to Dunlop Rubber Company Limited, London, England, a British company Application February 18, 1946, Serial No. 648,483
In Great Britain February 17, 1945

1 Claim. (Cl. 171—95)

My invention relates to improvements in or concerning apparatus for indicating and measuring electrostatic charges which are readily acquired, for example, by insulating materials through frictional contact with other insulators or with conductive surfaces.

In some circumstances these charges are detrimental to industrial processes as in the spinning of nylon or rayon, or in the processing of rubbers and may contribute thereto a considerable degree of hazard when capable of causing sparks in the presence of inflammable or explosive vapours or dust associated therewith.

The invention has for its object to provide improved electronic apparatus of a compact and portable nature capable under industrial conditions of indicating the voltage sign and quantity of an electrical charge on moving or stationary objects, the improved apparatus utilising an electrometer valve and electrode so arranged that the capacity to earth of the valve grid is reduced to a minimum and the insulation resistance of the valve maintained at a maximum whereby the highest sensitivity and accuracy are ensured with a corresponding facility of operation.

According to this invention electrical apparatus for indicating the surface potential of an object, comprises a tube closed at one end, an electrometer valve within the said tube, an electrode within the said tube and near the open end thereof the said electrode being connected to the grid of the said electrometer valve, and two sources of direct current, one of the said sources being connected to the valve filament, and the other of the said sources being connected to the valve anode through a device capable of indicating variations in the anode current.

In order that the invention may be more easily understood and readily carried into effect the same will now be described with reference to the accompanying drawings in which:

Fig. 1 is a circuit diagram of apparatus constructed in accordance with the invention.

Fig. 2 is a part sectional view to an enlarged scale of a portion of the apparatus.

Fig. 3 is a part sectional view of the portion of the apparatus shown in Fig. 2 with a condenser type cap fitted to the open end of the tube.

Fig. 4 is an end view of the apparatus shown in Fig. 3.

Referring to the drawings apparatus for carrying out the invention comprises a valve circuit including the filament 1 of an electrometer valve 2 having an effective grid resistance of about $10^{15}$ ohms. The filament is heated from a 2-volt accumulator 3. The negative pole of the accumulator is connected to one side of the filament through a fixed resistance 4 of 10 ohms to reduce the potential across the filament to one volt, and the positive pole of the battery is connected to the other side of the filament and is also connected to an earth point 5 and to a metal tube 6 about ten inches long and two and a half inches in diameter, which is open at one end and closed at the other within which the valve is positioned. As shown in Fig. 2 the grid terminal 7 of the valve is located about seven-eighths of an inch within the open end of the tube and is secured centrally to an electrode 8 in the form of a metal disc of about one inch in diameter so that any small deviation of the valve from the axis of the tube will not cause variations in the readings after calibration of the apparatus, particularly when the open end of the tube is partly closed by a metallic cap 9, Fig. 2, having a central aperture 10. Additional caps which are interchangeable may be provided having central apertures of graduated sizes serving to reduce the electrostatic field when measuring objects at high potentials to earth.

The valve anode 11, Fig. 1, is connected to one side of an indicating device such as an ammeter 12 reading from zero to 300 micro-amps and also to one side of a variable high resistance shunt 13 of 100,000 ohms whereby the ammeter is shunted to enable the zero of the voltage scale to be adjusted. The other side of the ammeter is connected to the other side of the variable high resistance shunt 13 and to the positive terminal of a battery 14 having a potential of 4.5 volts, the negative side of this battery being connected to the valve filament 1 and to the earth point 5.

The scale of voltage has its zero marking 0 towards the maximum deflection position of the indicating device or meter since the voltage scale reads from right to left contrary to the conventional direction owing to the operation of the valve causing the anode current to decrease when a negative voltage is induced on the grid 15. In order to allow positive voltages to be recognised and determined, the zero of the voltage scale is set during calibration at about nine-tenths of the full scale meter reading since the sign of such voltages is indicated by an increase in anode current. The voltage scale increases as the current through the meter decreases. It is calibrated in steps of 100 volts between zero and 1500 volts on a plane surface situated at one foot distance from the instrument when the end of the metal screening tube 6 is fully open.

Voltages ranging from 50 volts at six inches from the charged surface of the object tested, to one million volts at six feet therefrom can be determined with considerable accuracy when using suitable caps with suitable sized apertures. For example, by covering the end of the tube with a cap having a central hole of 0.95 inch diameter the voltage range of the instrument is multiplied by 10 times, and a hole of 0.45 inch diameter causes the voltage range to be multiplied one hundred times. By fitting a probe electrode to the valve grid instead of the disc electrode shown the sensitivity of the instrument may be increased or small local variations in voltage investigated according to the size of the probe.

In order to enable the potential of the valve grid 15 to be reset to a known stable condition should the grid become charged, and to enable the grid to be "earthed" when positive charges on the object are to be evaluated, a potentiometer 16 of 100,000 ohms is shunted across the terminals of a grid bias battery 17 having a potential difference of the order of 4.5 volts, the variable voltage lead 18 from the potentiometer 16 being connected to the grid 15 through a switch, the contacts 19 of which are closed against spring load by a switch button 20 Figs. 2 and 3, which pierces the metal tube 6. A switch 27 between resistance 16 and the unearthed terminal of battery 17 enable grid 15 to be earthed without altering the setting of the potentiometer by opening switch 27 and closing switch 19. To apply a voltage to grid 15 the switches 27 and 19 are both closed.

The whole of the apparatus may be designed to fit into a portable case adapted to contain the two variable resistances 13 and 16, the batteries 14 and 17, and the multiple lead 26, Fig. 2, extending from the valve 2 which lead may terminate for convenience in a connector, not shown, adapted to plug into a socket secured to the portable case, the connector also serving to disconnect the grid-controlling battery 17 from its potentiometer 16 when the apparatus is not in use. It is desirable to connect an earthed lead to the earth point of the apparatus during operation to avoid errors due to the operator or apparatus acquiring a potential other than earth potential.

Since the grid 15 of the valve will eventually attain a negative potential of about 2 volts due to flow of grid current, in setting up the apparatus the grid is rapidly charged to about this potential by pressing the switch button 20 to connect the variable voltage lead 18 and the potentiometer 16 to the valve grid 15 after inserting the plug into the socket on the case. The reading of anode current is then allowed to become stable and when stable is reduced to the zero voltage point on the scale of the indicating device or meter 12 by adjustment of the anode shunt resistance 13 in a field free from electrostatic charge. Such field may be provided by placing a closed cap on the open end of the metal tube 6 in which the valve and electrode are located. The switch button 20 is then pressed to apply to the valve grid 15 a negative grid bias voltage which is adjusted by manipulation of the potentiometer variable voltage lead 18 to maintain the anode current reading at zero. The potentiometer when so set delivers a voltage equal to the "free" grid voltage and is available for resetting the grid subsequently to this voltage when and as required. By "free" grid voltage is intended the voltage which the grid will acquire due to its collection of electrons within the valve when the grid is not connected to any external source of potential. The apparatus is now ready for use.

The apparatus measures the potential gradient of the electrostatic field and consequently for sources having potential fields emanating from planar surfaces the grid voltage is inversely proportional to the distance from the plane surface of such source to the electrode of the instrument.

To measure the voltage on a plane source the open end of the tube is pointed at the source and at a distance from the source such that an angle of not less than 90° is subtended at the open end of the metal tube 6. The action of the meter is observed. If the voltage reading increases immediately to a stable value, (the current through the meter decreasing), and returns to zero on removal of the electrode and tube from the field, the source is negative to earth. The actual value of the voltage on the source is obtained by multiplying the voltage scale reading by the distance in feet from the source and by the multiplier factor if an apertured cap is used.

If however the current through the meter increases instead of decreases as indicated by the needle moving off the voltage scale, it indicates that a positively charged source is being observed. To measure the value of this, the grid is "earthed" by pressing the button 20 which connects the switch contacts 19 and releasing the button while the instrument is still in the potential field and then removing the instrument from the field. Such removal causes a negative charge to be induced on the grid of the valve, and the induced negative charge on the grid causes a decrease in the anode current and an indication on the meter of the voltage present. The value of the positive voltage is calculated exactly as in the case of the negative sources. The meter is reset to zero by pressing the contact button 20.

If the source alternates in voltage, the anode current will be observed to decrease steadily and more slowly than with static negative voltages due to the flow of grid current during the positive portions of the cycle, and so the grid gradually acquires a negative charge and the meter indicates the voltage of the source. Since the grid retains its negative charge when the meter is withdrawn from the field the anode current reduction remains when the instrument is removed from the field and moreover it has been obtained without closing the switch. In this way alternating voltage fields are clearly distinguishable from both positive and negative fields. The voltage of the source may be calculated in the same manner as in the other cases.

A direct measurement of the quantity of charge in coulombs per square centimetre of surface is obtainable across a condenser of known capacity, by calibration from the voltage across such condenser. A suitable condenser for this purpose consists of a flat cap as shown in Figs. 3 and 4 the cap having three one-centimetre distance pieces 21 of insulating material at its edge and having a small central aperture 23 in which a metal probe 22 is centred by an insulating bush 24. One end of the probe 22 is substantially coterminous with the aperture in the face of the cap and the other end is adapted to make contact with the grid terminal 7 of the electrometer valve when the cap is affixed to the open end of the tube 6. It is convenient to be able to use the same scale divisions for indicating quantity in coulombs as well as voltage. This may be effected by utilising the equation $Q = CV \times 10^{-12}$ where Q is coulombs per square centimetre, C is the capacity of the condenser in micro-micro farads, and V is the voltage applied thereto. The axial position of the probe relative to the plane surface of the cap is adjusted until a convenient relation is obtained for example in which each 100 volts division measures surface charge in units of $10^{-10}$ coulombs per square centimetre.

In operating the apparatus to measure the quantity of charge, the condenser type of cap is fitted to the open end of the tube as shown in Fig. 3 and is pressed against the source shown at 25 in dotted lines from which the cap is spaced by the distance pieces 21. After operating the switch button 20 if the charge is positive the quantity of charge is read from the scale of the indicating device—in units of $10^{-10}$ coulombs per square centimetre—for each division of scale deflection. For this reading to be accurate the condenser cap must comprise the main capacity to earth of the source, a condition met within an error of ten per cent if the nearest earthed object is not nearer than ten centimetres.

The resistance to earth of an object may also be measured. Such measurement is conveniently based upon observation of the time required for a given voltage—applied to one of a series of condensers of known capacity—to decrease by a known amount. For this purpose one of a series of condensers of 0.2, 0.02, 0.002, 0.0002 or 0.00002 microfarad is charged from the grid bias battery 17 with a voltage of 4.1 volts and the time in seconds is observed which is required for this voltage to decrease to 2.5 volts. The readings obtained from each of such condensers indicate respectively resistances of $10^7$, $10^8$, $10^9$, $10^{10}$, and $10^{11}$ ohms for a discharge time of one second. In operating the apparatus to measure such resistance a condenser of suitable capacity is selected and connection is made from the grid of the valve to one side of the condenser and to one side of the object to which the resistance to earth is required, the remaining sides of the condenser and resistance being connected to the valve filament and to earth. The switch button 20 is pressed and the grid bias potentiometer adjusted until the meter needle indicates 4.1 volts. The button 20 is released and the time in seconds is observed which is required for the meter needle to move and indicate 2.5 volts. The observed time (which is less than ten seconds) is multiplied by the resistance range appropriate to the condenser used, the product so obtained being the resistance to earth of the object in ohms.

Having described my invention what I claim is:

Apparatus for measuring the surface potential of an object, which comprises a metal tube closed at one end and having an earth connection, an electrometer valve within said tube having a filament, an anode, and a grid therebetween and an electrode within said tube near the open end thereof and connected to the grid of said valve, a cap adapted to fit over the open end of said tube, said cap having distance pieces of insulating material spaced apart upon its face and being provided with a probe extending through a bushing of insulating material located in an aperture in said cap into contact with the said electrode, a current-measuring device having one terminal connected to the valve anode and the other to a connection for one terminal of a source of direct current, an earth lead for connection to the other terminal of said source, a variable high-resistance shunt in parallel with said device, leads for connecting the valve filament to a source of electric energy and for earthing one terminal of said filament, and means for applying a predetermined voltage to the grid and for earthing the grid as required comprising a resistance, a movable contact arm connected to said grid, a switch between said grid and said movable contact arm, an earth lead connected to one end of said resistance, a switch connected to the other end of said resistance, a lead for connecting the last mentioned switch to one terminal of said second source of direct current and a lead for connecting the earthed end of said resistance to the second terminal of said second source of direct current.

DOUGLAS BULGIN.

REFERENCES CITED

The following references are of record in the file of this patent:

UNITED STATES PATENTS

| Number | Name | Date |
|---|---|---|
| 1,684,768 | Iler | Sept. 18, 1928 |
| 2,178,954 | Dehmel | Nov. 7, 1939 |

FOREIGN PATENTS

| Number | Country | Date |
|---|---|---|
| 309,576 | Great Britain | Mar. 20, 1930 |
| 463,370 | Great Britain | Mar. 30, 1937 |

OTHER REFERENCES

"A Portable Electrometer for the Measurement of Electrostatic Charges," Journal of Scientific Instruments, August 1945.

Radio Engineering Handbook, Ed. Henney, 3rd edition, published by McGraw-Hill in New York and London, 1941.

Radio Engineering Handbook, Ed. Terman, 1st edition; published by McGraw-Hill in New York and London, 1943.